Patented Aug. 8, 1950

2,518,017

UNITED STATES PATENT OFFICE 2,518,017

CHLORINATION OF 1-VINYLCYCLO-HEXENE-3

Herbert L. Johnson, Media, and Archibald P. Stuart, Norwood, Pa., assignors to Sun Oil Company, Philadelphia, Pa., a corporation of New Jersey No Drawing. Application July 10, 1946, Serial No. 682,598

1 Claim. (Cl. 260—648)

This invention relates to the chlorination of 1-vinyl-cyclohexene-3 and to chlorination products obtained thereby.

According to the invention novel compounds, for example, vinylcyclohexene dichlorides and vinylcyclohexene tetrachloride, can be prepared by the chlorination of 1-vinylcyclohexene-3 under conditions hereinafter described. The nature and the amount of any particular compound formed can be controlled to a considerable extent under conditions hereinafter specified.

As stated, the compounds formed, according to the invention are chlorinated derivatives of 1-vinylcyclohexene-3. Herein and in the claim the term "vinylcyclohexene" refers to 1-vinylcyclohexene-3 only. The dichlorides of vinylcyclohexene, obtained upon chlorination of vinylcyclohexene as hereinafter described are two in number. For convenience, reference to these derivatives will be made as follows: the alpha dichloride of vinylcyclohexene is the dichloride which has the lower boiling point and contains the chlorine in the ring; the beta dichloride of vinylcyclohexene is the dichloride which has the higher boiling point and contains the chlorine in the side chain. The tetrachloride is, of course, that compound of vinylcyclohexene in which four chlorine atoms have been attached, two to the ring and two to the side chain or vinyl group, e. g. 1 - ($\alpha,\beta$ - dichloroethyl) - 3,4 - dichlorocyclohexane.

Another chlorinated derivative of vinylcyclohexene found to have been prepared when chlorinating vinylcyclohexene, according to the invention, under the hereinafter described conditions, appears to be monochlorovinylcyclohexene. As employed herein and in the appended claim the terms "monochlorovinylcyclohexene" and "monochloro compound" are that compound which can be considered derived from vinylcyclohexene by replacing a hydrogen atom in vinylcyclohexene.

Monochlorovinylcyclohexene appears to be formed by the substitution of a hydrogen atom in the ring by a chlorine atom. The boiling point and chlorine analysis appear to confirm the composition of monochlorovinylcyclohexene at least to the extent that the two double bonds of vinylcyclohexene appear not to have been saturated.

The following tabulation lists some of the properties of the compounds of the invention.

| Compound | B. P., °C. | P., mm. Hg | $N_D^{20°C.}$ | Per Cent Cl | |
|---|---|---|---|---|---|
| | | | | Calc. | Found |
| Monochloro VCH | 68 | 13 | 1.4965 | 24.87 | 25.06 |
| VCH $\alpha$-dichloride | 61-3 | 2 | 1.4993 | 39.58 | 39.39 |
| VCH $\beta$-dichloride | 70 | 1.2 | 1.5043 | 39.58 | 40.08 |
| VCH tetrachloride | 107-9 | 0.4 | 1.5255 | 55.43 | 56.64 |

As stated the compounds of the invention are prepared by chlorination of vinylcyclohexene. The chlorination of vinylcyclohexene was effected in substantially anhydrous liquid phase employing usual laboratory equipment and technique. However, it was discovered upon performing the chlorination under different conditions that depending upon the conditions selected it is possible to obtain any of the desired chlorinated derivatives in quantities enabling practical separation from the reaction mixture. Exclusive of the preparation of the tetrachloride which has been found to be relatively simple, it has been discovered possible to prepare the alpha-dichloride in quantities predominating the beta-dichloride with the exclusion of the formation of the monochloro compound. Thus, it has been discovered that the lower the temperature the greater will be the ratio of alpha-dichloride to beta-dichloride. For example, at a chlorination temperature in the neighborhood of about —80° C., say —60° C., this ratio is about 4 to 1. At 0° C. this ratio is about 1½ to 1. At 20° C. the quantities of alpha-dichloride and beta-dichloride formed are about equal. Thus, unexpectedly it is possible to chlorinate vinylcyclohexene to prepare one of the two dichlorides in predominant amounts. The monochloro compound, discovered to be formed at higher temperatures, is not formed at lower temperatures, say below minus 30° C. Therefore, according to the invention there is provided a process for the preparation of predominant quantities of alpha-dichloride by chlorinating vinylcyclohexene at low temperatures in the range —80° C. to about 15° C., preferably in the neighborhood of —60° C.

As the temperature is increased it has been discovered that the quantity of the monochloro compound formed in the mixture of chlorides tends to equal the quantity or quantities of each of the alpha-dichloride and beta-dichloride. Thus at higher temperatures, say up to about 130° C., the boiling point of vinylcyclohexene, it is possible to form substantial quantities of the monochloro compound, while at temperatures of about —30° C. only a trace is obtained.

Therefore, according to the invention, there is provided a process for the preparation of a mixture of the monochloro compound, the dichlorides and the tetrachloride which is formed at all temperatures recited.

The rate at which the chlorine is passed into the vinylcyclohexene can readily be determined by one skilled in the art knowing that the chlorination can be made to proceed. However, it is to be noted that, with the usual laboratory equipment employed, rates substantially above 1 gram/minute/mol vinylcyclohexene would yield no practical result at zero °C. At lower temperatures the rate can be increased somewhat. Best results have been obtained with rates of about 0.3 gram/minute/mol vinylcyclohexene.

The use of a solvent for vinylclohexene has been found to increase control and therefore the yield of the desired products. Solvents employed have been chlorinated hydrocarbons and carbon disulfide. Other solvents are not excluded from the scope of the invention. These should, of course, not react with vinylcyclohexene or with chlorine to form undesirable compounds.

The following examples serve to further illustrate the methods and compounds of the invention.

Example I

One mol of vinylcyclohexene was dissolved in an equal volume of carbon tetrachloride, and cooled to 0° C. while chlorine (1 mol) was added at the rate of 0.25 gram per minute. The product was washed with water and 5% sodium bicarbonate and dried over anhydrous calcium chloride. The solvent was distilled off, and the residue fractionated under reduced pressure. There was obtained:

33.2% of unconverted vinylcyclohexene
12.2% of monochlorovinylcyclohexene, B. P. 70° C. (18 mm.)
21% of vinylcyclohexene α-dichloride, B. P. 61–3° C. (2 mm.)
15.9% of vinylcyclohexene β-dichloride, B. P. 70° C. (1.2 mm.)
17.7% of vinylcyclohexene tetrachloride, B. P. 99° C.–101° (1 mm.)

with a total recovery of 85%.

Example II

Another run was made under analogous conditions, except that 2 mols of chlorine were added, yielding the following results:

13.5% vinylcyclohexene
12.4% monochlorovinylcyclohexene
29.7% alpha-dichloride
20.7% beta-dichloride
23.7% tetrachloride with a total recovery of 81.5%.

Example III

In a run at —60° C., 2 mols of chlorine were added to 2 mols of vinylcyclohexene at a rate of 0.28 gram per minute. The products obtained were as follows:

45.0% unchanged vinylcyclohexene
0.0% monochlorovinylcyclohexene
17.2% vinylcyclohexene alpha-dichloride
4.5% vinylcyclohexene beta-dichloride
33.3% vinylcyclohexene tetrachloride with a total recovery of 91.5%.

The compounds of the invention appear to have use as plasticizers.

From the foregoing it will be evident that wide variation within the scope of the invention and the appended claim is possible. The essence of the invention is that methods for preparing novel compounds of vinylcyclohexene have been discovered and the novel compounds prepared.

We claim:

A process for the preparation of monochlorovinylcyclohexene which comprises introducing gaseous chlorine into a solution of 1-vinylcyclohexene-3 in an inert solvent at a temperature of from about 0° C. to 130° C., and separating monochlorovinylcyclohexene from the reaction mixture.

HERBERT L. JOHNSON.
ARCHIBALD P. STUART.

REFERENCES CITED

The following references are of record in the file of this patent:

FOREIGN PATENTS

| Number | Country | Date |
| --- | --- | --- |
| 268,722 | Germany | Dec. 29, 1913 |

OTHER REFERENCES

Ellis: "Chemistry of Petroleum Derivatives," vol. II, page 767 (1937).

Lebedew et al.: "Chemisches Zentralblatt," vol. 83, page 1440 (1912, I).

Brown et al.: "Chemical Society Journal," 1944, pages 101–3.